J. B. BARTHOLOMEW.
BAND CUTTER AND FEEDER.
APPLICATION FILED SEPT. 8, 1894. RENEWED OCT. 30, 1909.
959,445.
Patented May 31, 1910.
4 SHEETS—SHEET 1.
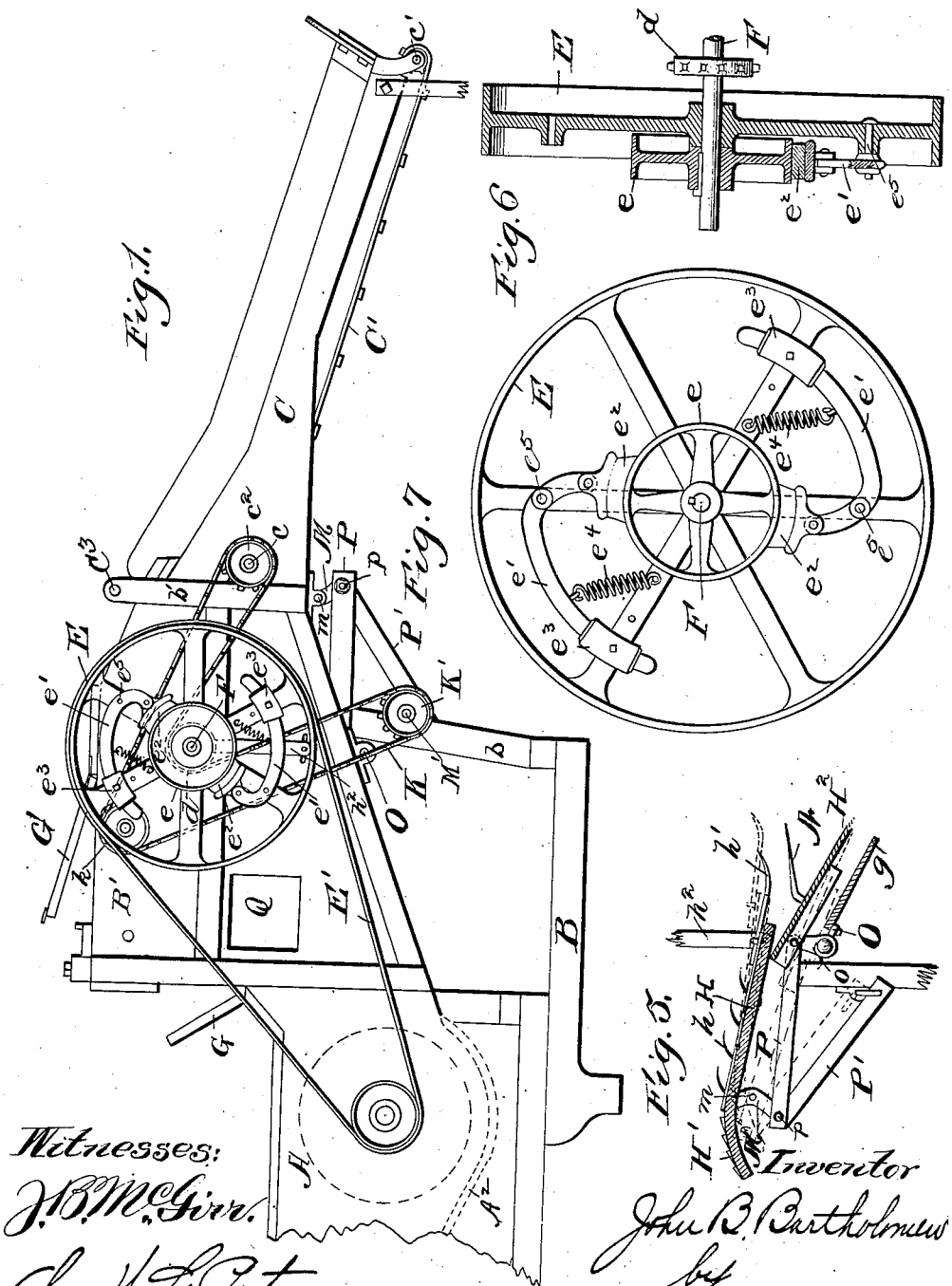

J. B. BARTHOLOMEW.
BAND CUTTER AND FEEDER.
APPLICATION FILED SEPT. 8, 1894. RENEWED OCT. 30, 1909.
959,445.
Patented May 31, 1910.
4 SHEETS—SHEET 2.
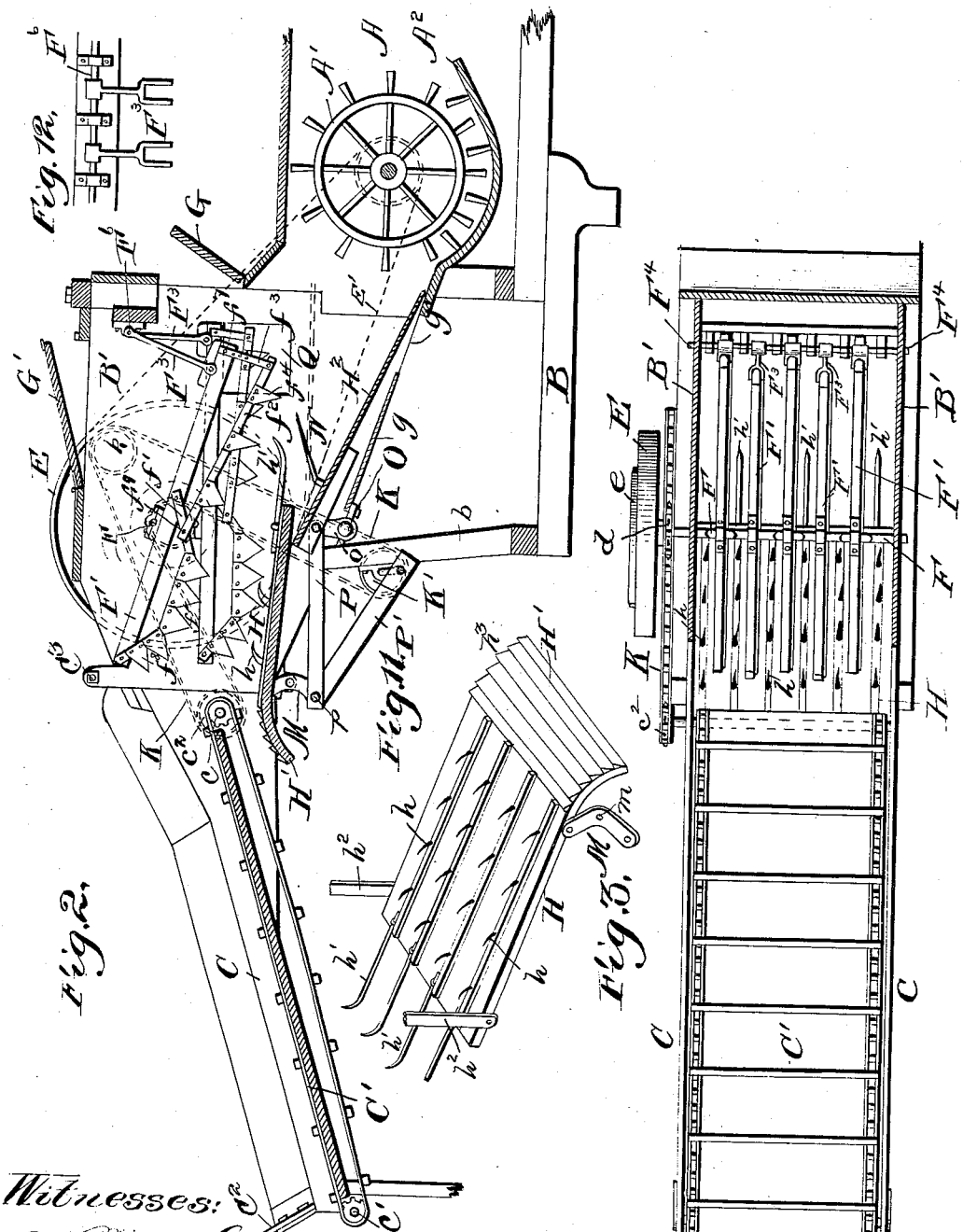

J. B. BARTHOLOMEW.
BAND CUTTER AND FEEDER.
APPLICATION FILED SEPT. 8, 1894. RENEWED OCT. 30, 1909.
959,445.
Patented May 31, 1910.
4 SHEETS—SHEET 3.
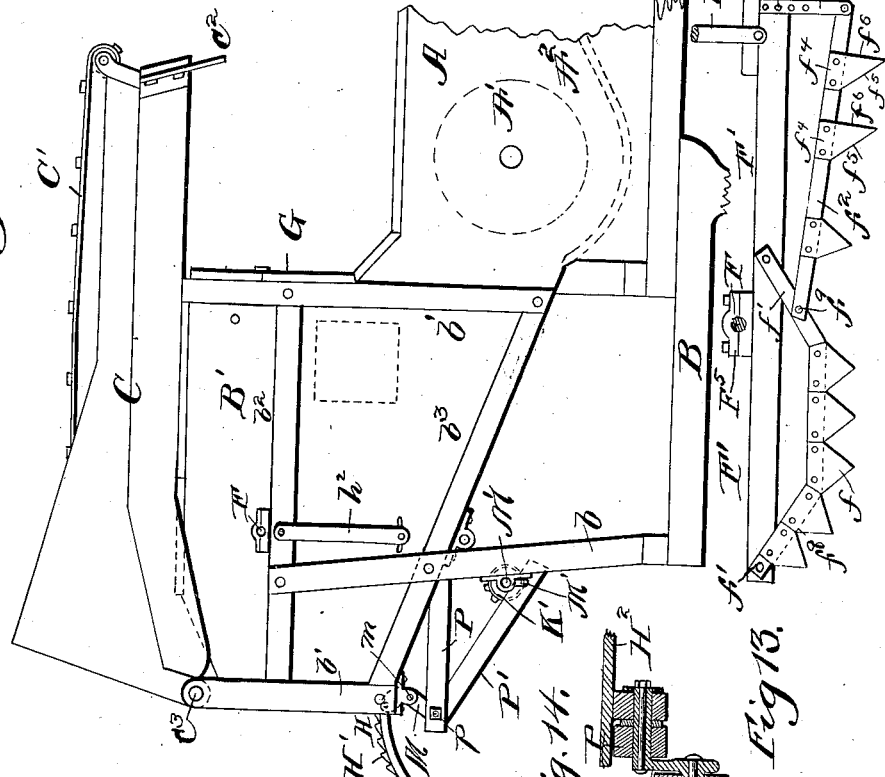
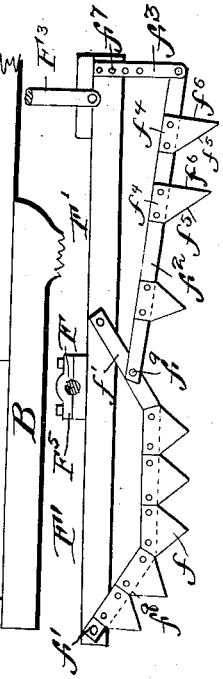
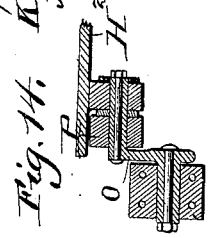
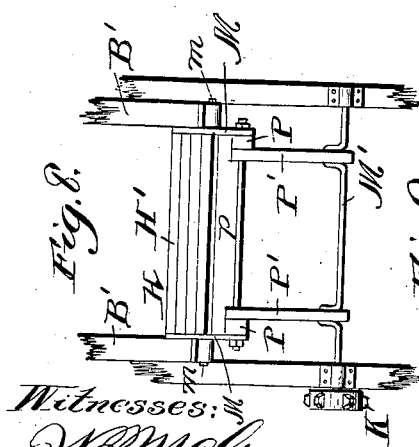
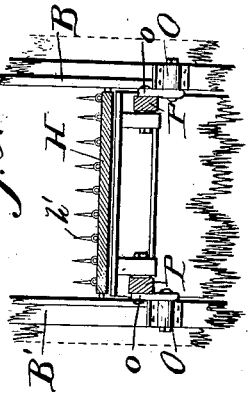
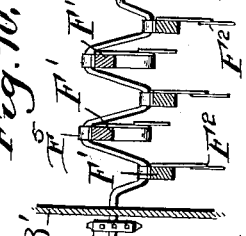

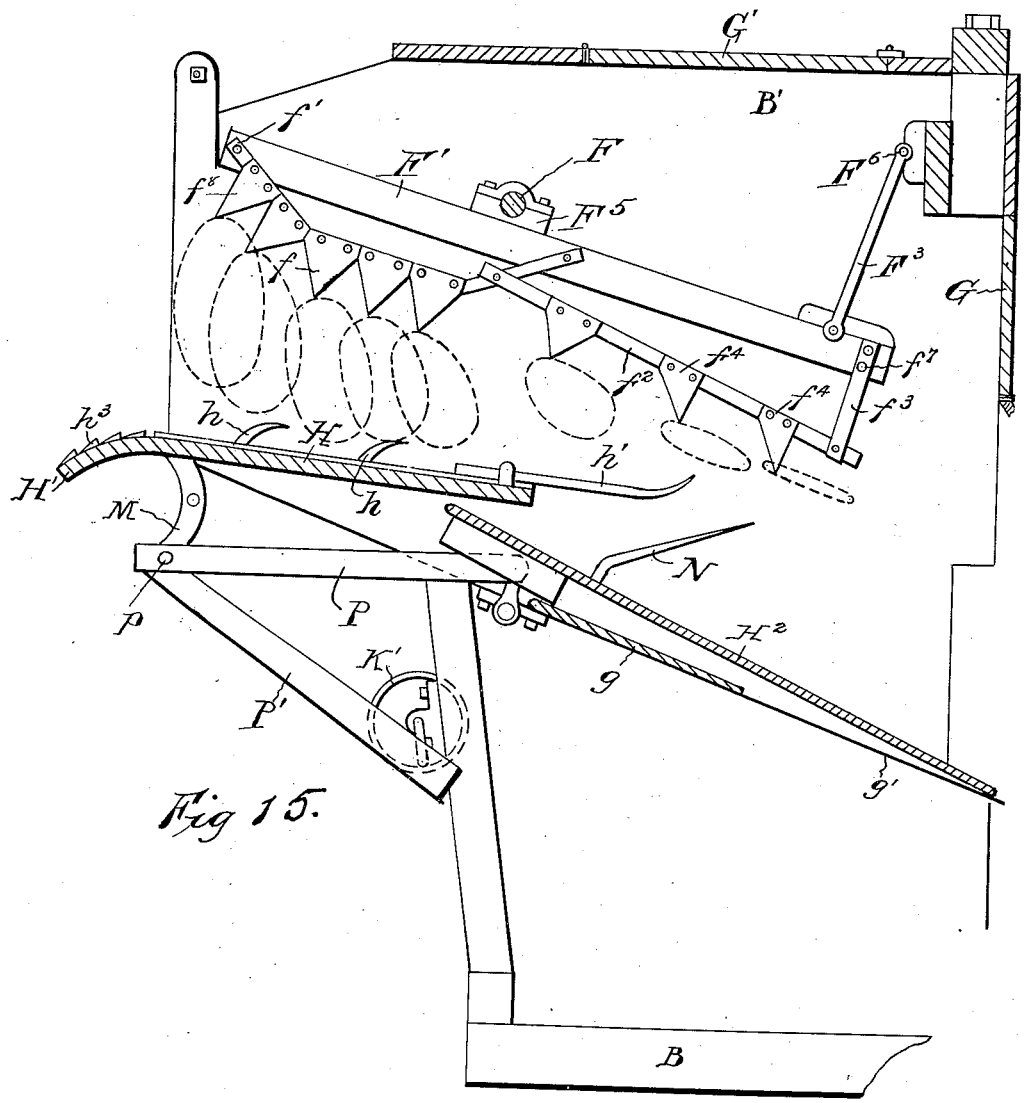

UNITED STATES PATENT OFFICE.

JOHN B. BARTHOLOMEW, OF PEORIA, ILLINOIS, ASSIGNOR, BY MESNE ASSIGNMENTS, TO AVERY COMPANY, A CORPORATION OF ILLINOIS.

BAND-CUTTER AND FEEDER.

959,445.     Specification of Letters Patent.     Patented May 31, 1910.

Application filed September 8, 1894, Serial No. 522,437. Renewed October 30, 1909. Serial No. 525,552.

*To all whom it may concern:*

Be it known that I, JOHN B. BARTHOLOMEW, citizen of the United States, residing at Peoria, in the county of Peoria and State of Illinois, have invented certain new and useful Improvements in Band-Cutters and Feeders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a side elevation of a band cutter and feeder embodying my invention. Fig. 2 is a central longitudinal section. Fig. 3 is a plan view. Fig. 4 is an elevation from the side opposite that in Fig. 1, the feeder conveyer being turned to the folded position. Figs. 5 to 15 are detail views.

In the drawings I have shown a portion of the cylinder end of a threshing machine, sufficient to illustrate the manner of combining my improved band cutter and feeder, with such a machine.

The cutter and feeder is made up of two parts, one being that which initially receives the gavels or bundles, and the other the part which effects the cutting of the band and the delivery and distribution of the straw to the cylinder. They are supported on or connected to the front part A of the thresher by a frame at B below the cylinder A′ and concave A².

$b$, $b'$ indicate uprights on each side, and $b^2$, $b^3$ represent side sills connecting them.

B′, B′ indicate the side walls attached to the above described frame, there being a bottom board at $g$ and a cover having a top door G′ and a front door G.

To the frame-work above described there is hinged a supplemental frame for the initial carrier C′, having side pieces C C, a tail board $C^2$ and shafts at $c$, $c'$ with sprocket wheels for receiving power and imparting it to the carrier C′. This supplemental frame is pivotally connected to the parts above described at its upper forward end as shown at $C^3$, the parts being so shaped and related that the carrier and its frame can be folded up into the position shown in Fig. 4 whereby the mechanism is made compact.

It will be seen that the frame for the carrier C′ is so connected to the body of the main casing that when in a lowered or working position its forward end bears closely against the rear ends of the side walls of the said main casing, so that it may be supported without the use of a support at its free end. When placed in a non-working position, or folded back on the main casing, this supplemental frame rests on the main casing throughout the greater portion of its length and is thereby supported without any strain on its hinge or pivot connection, at $C^3$. When it is down in a working position, as in Fig. 2, the carrier delivers the gavels or bundles to the cutting and distributing apparatus, the latter being constructed and operated as follows: F is the main power shaft. It is provided with a loose band wheel E which is connected by a belt E′ to the pulley of the threshing cylinder. When the cylinder is revolving at a relatively slow speed there is no engagement of wheel E and shaft F, and, consequently, the band cutting and straw feeding mechanism is thrown out of action. But when the speed of the cylinder, and therefore of the wheel E, is raised sufficiently high the wheel is brought into frictional engagement with the parts which it drives by means of a wheel or drum $e$ keyed to the shaft F, and adapted to engage with the friction shoes $e^2$ carried by the arms $e'$. These arms are pivoted at $e^5$ to spokes of wheel E, and each is provided with an adjustable weight $e^3$. When the speed of the wheel E rises the weights $e^3$ are thrown outward, and the other ends of the lever or bars $e'$ are thrown inward, which results in the shoes or blocks $e^2$ being pressed tightly against the drum or wheel $e$. When the speed of the wheel again falls below the predetermined point the springs $e^4$ act to draw the weighted ends of levers $e'$ inward and decrease the friction exerted by the shoe $e^2$. On the shaft F there is keyed a sprocket wheel $d$ which engages with a chain K which passes from that wheel to the sprocket wheel $c^2$ on the driving shaft $c$ of the above described initial carrier C′, and thence to an idler wheel $k$, from which it goes and engages with a wheel on one of the crank shafts to be described and thence backward to the wheel $d$. It will be seen that when the speed of the cylinder is too low for efficiency in threshing all of the feeding mechanism will be stopped.

The shaft F actuates directly the band cutting apparatus which is constructed and mounted as follows: F', F' designate a series of bars which are mounted on the shaft F by bearings at F⁵, the shaft being formed with cranks of a corresponding number, as shown in Fig. 10. These bars extend rearward and forward from the shaft, moving freely and without support at their rear ends, but at their front ends being supported by link carriers F³ pivoted to the frame-work at F⁶. By employing links of this sort in conjunction with the crank arranged in the way shown I attain desired results as will be set forth below. To the rear part of each bar F' there is secured a metal bar f', Fig. 13, which supports the detachable cutters f⁸, f. These have inclined cutting edges at the front and the rear, they being preferably of substantially the shape of harvester cutters. f² indicates another cutter bar below the main bar F'. It is pivoted at f⁹ to the bar f', and at the front end is adjustably supported by a link f³, which can be fastened by a pin f⁷, in either of several positions. This front cutter bar f² has peculiarly shaped cutters f⁴ at its forward end. The rear edge f⁵ of each of these is inclined so that the cutting action shall be accomplished on the backward stroke of the bar, whereas on its forward stroke its action is rather to engage with, distribute and advance the straw just as it is entering the cylinder chamber. The cutters at f⁸ and f may be said to constitute grain fenders and depressors operating to deflect and force the grain downward as it leaves the carrier C'. It will be seen that the cutter bars are so arranged and guided that the rear end of each is carried to a relatively high point so that it can be elevated above the incoming gavels or bundles, and then descend upon them and drag the rear set of cutters f⁸ carried by the bar f' swiftly through them longitudinally to insure the severing of the bands; and that if those cutters f which are parallel with the bar should fail to strike and cut the band those at f⁴ which are on a line inclined to the bar will as the crank rises and moves rearward be brought into such an active position that they will also traverse the line of the band and cut it if it has escaped the others. And to still further guard against an accidental escape the front bar f² has one or more similar cutters.

The floor of the cutting chamber comprises two main parts peculiarly constructed and placed. The rear portion H upon which the bundles are first delivered lies beneath the cutters f⁸ at the rear of the bars F'. In order that it may impart a forward throw to the bundles, as well as lift them up slightly toward the knives I combine with it reciprocating mechanism adapted to give it the desired movement. At the front end it is suspended upon links h² which lie on the outside of the casing but have pivot pins which pass through slots therein and support this floor section H. At the rear it is connected to two levers M which at their centers are pivoted, at m, to the framework, and at their lower ends are connected by a shaft or bar p. The sprocket wheel K' above referred to rotates a crank shaft M' which is connected by pitmen P' with the above mentioned bar p. When shaft M' is rotating the levers M will be vibrated and the table H will be moved forward and back. As shown in Fig. 11, I prefer to make the main forward portion of the floor H with a flat upper surface, and, to cause an engagement with the bundles teeth h are inserted into the floor H or are secured to strips which are fastened thereon. These are inclined forward so that they will have a pushing action on the straw when moving in that direction, but they will move backward freely.

h' h' are prolonged fingers with their forward ends preferably inclined or curved upward. They are secured to and project forward from the vibrating table H and act to insure that the bundles shall be held up long enough to be cut, and then assist in dividing or separating them into uniform masses across the machine.

The rear end H' of the table H is extended backward and curved downward and formed with a series of ratchet grooves. It acts to catch all the loose grain which may be shaken loose from the bundles as they are carried forward on the conveyer C', the heads or berries being caught in the grooves h³ and advanced to the table H by the reciprocations.

The front portion of the floor is indicated by H². It rests at the front edge on the thresher frame adjacent to the concave and slides somewhat toward and from the cylinder. The rear edge is moved forward and back and also up and down by means of links P which are hung on the aforesaid bar p, and which at their front ends are carried by links or cranks o which are connected to the rear part of the floor H².

At N there are elongated fingers inclined sharply forward which perform the final work of disintegrating or separating the straws and impelling them toward the cylinder. These parts N assist in retarding or holding back the lower part of each mass of straw as it is advanced. The reciprocating parts above the straw feed the top parts of the bundle forward more rapidly than the said lower parts and afford sufficient down pressure to enable the retarding devices to properly act, the machine in this respect differing from those wherein use has been made of a reciprocating pan or board below the straw and adjacent to the cylinder, but without any means opposed to it above the straw for giving such pressure and rapidly feeding forward the top parts. Both this pan or table H² and the reciprocating bars above the straw are immediately adjacent to the cylinder, and the pan or floor board is inclined at such a sharp angle to the horizontal that the straws reach the cylinder on lines substantially tangential, and not radial, and therefore the cylinder teeth instantly and rapidly can remove the grain berries from their heads without interference from the straws proper. The retarding of the lower parts of the straw masses is facilitated by the parts at $h'$ which reciprocate oppositely to those at N; and although either one of them can be employed alone I prefer to use the two combined, for with the two sets of parts reciprocating in opposite directions either one or the other is always moving backward, thus furnishing a continuous retarding support to hold the straw up to the action of the cutting and feeding knives. Furthermore when the platform H and table H² in their reciprocations move away from each other, the projections $h'$ and N tear apart and open up the straw so as to coöperate effectively with the downwardly acting feeding devices to distribute the straw evenly and feed it uniformly to the cylinder, the overloading of the latter being avoided. I do not limit myself to exactly the form shown at N for these retarding parts, as it is well known at this time that others of modified form can be substituted such as plates or boards having upwardly extending edges at their upper ends so arranged as to temporarily check the straw while the upper parts of the bundles or masses are being more rapidly advanced to the cylinder by the reciprocating bars above. The rear part of this floor H² being held by a hinge like support it can be thrown up so as to permit access to the cylinder chamber through the large opening at $g'$ when necessary to make repairs, to remove obstructions, etc. This floor or pan receives the tailings from the thresher which are brought back from the rear parts (not shown) of the machine by any suitable carrier and delivered through a passage as at Q; and as the floor is rapidly vibrating these tailings are distributed in a sheet and properly delivered again to the cylinder.

With respect to the parts above described for throwing out of action the bundle carrier, its driver, the cutters, their driver, and the straw spreading devices and their driver, it is to be noted that in other machines the practice generally is to drive each of these by a separate train of parts, and interpose a centrifugally acting speed controller or stop mechanism between the power parts and the bundle carrier only, the cutters, and the straw spreading parts and their drivers not being affected. The result of this is that while the bundle carrier may stop, all the other parts which advance the grain to the thresher continue their motion and continue feeding to the cylinder; and serious disadvantages grow out of this as the cylinder speed often drops low and the incoming masses of straw choke it. With a machine of the character of that herein and of the usual size there will generally be between the end of the carrier C' and the cylinder from four to six large bundles of grain. If the cutting and feeding devices are allowed to continue with a falling motion of the cylinder the result is unavoidably the crowding of a large mass of grain into the cylinder chamber, this in many cases so effectually clogging and stopping the cylinder as to make it impossible to again start even under the action of the most powerful engines used for such purpose. With the present machine this is obviated as the driver of the bundle carrier, (the sprocket wheel $c$) the drivers for the cutters (the crank shaft F) the driver for the straw supporting and spreading table (sprocket wheel K', crank shaft M', etc.) are all simultaneously thrown out of action. Moreover this is accomplished by devices which not only stop the action of the cutters and cylinder feeding parts quickly, but which also (when the cylinder speed again comes up to the predetermined limit) gradually start all of these parts. It is necessary to so start them when they are heavily loaded and the friction clutch which I interpose between the cylinder shaft and the cutting and feeding mechanism is greatly superior to the suddenly acting pin clutches or ratchet and dog devices that have been used in other machines. The two wheels E, $e$ are respectively connected permanently with the driving and driven parts and are so related that they can be readily disconnected quickly by the centrifugally governed clutch controller and as readily connected gradually. By placing these wheels and the governor weights directly on the cutter shaft I provide not only, as described, the means for connecting and disconnecting, but also furnish a momentum generating part which insures a smooth and uniform movement of the cutters notwithstanding their reciprocating movements and notwithstanding the fact that there are frequent severe variations in their work.

It will be seen that the forward or inner ends of the cutter bars are held by non-rotary supports or guides, they being in this instance the links F³. These are in contrast with and operate materially different from the supports of the other style which have been used or proposed for this purpose, namely a second set of cranks. In some earlier machines the reciprocating cutter carriers were suspended upon and actuated by two transverse similar crank shafts. These act to impart complete rotations to both ends of the cutter carriers, the latter being carried in such way as to be kept at all times in positions of parallelism. As the cranks rise they lift both ends in similar paths to positions well above the bundles or straw masses, and as they descend they cause the cutters of the entire series to operate alike. But in the present machine, the cutters at the rear end of the cutter carrier have at all times a very different movement from that of those at the forward or inner end. The crank is connected with the cutter carriers at points remote from the rear or outer end, and therefore said end can be lifted well up for the entrance of the incoming bundle and an effective cutting blow can be struck as it descends; and at the same time the cutters at the front or inner end are held in such paths that they are constantly ready to engage with the straw for advancing and spreading it. The paths of the rear cutters are curved lines approximately elliptical in shape with their longer axes approximately vertical; and the paths of the front or inner cutters are also on curved lines approximating flat ellipses with their longer axes approximately horizontal. In this respect there can be considerable modification within limits without departing from the principle of construction and operation of the machine. These desired paths for the cutters at the rear or outer ends of the carriers can be best attained by pivoting the carriers directly to the cranks without the interposition of links, which latter plan has been sometimes followed, such links having a tendency to carry the rear cutters in paths whose longer axes are horizontal rather than vertical, thus decreasing the entrance for the bundles and increasing the liability of the cutters to first suddenly engage on longitudinal lines with the bundles and jerk or thrust them toward the cylinder. And so long as this direct hinging of the cutter carrier to the cranks is maintained there can be variation in the construction of the carriers and in their positions relative to the crank shafts. The downward and forward blows or impacts from the cutters and the feeders adjacent to the cylinder are not received in any way by the endless carrier as has been the case in other machines, the straw holding parts in this construction which act when the cutting and spreading occurs being, as above described, of the nature of floors with table-like supports at the bottom from which rise the projections or teeth and the retarding devices above described. Of course some of the advantages can be retained if the straw be delivered to the second table $H^2$ by a propelling device other than one like that at H provided that the cutting device be arranged substantially as is herein shown, that is to say, so as to be situated in and move across the planes of the adjacent ends of the reciprocating table $H^2$ and the table or carrier which delivers the straw to it. The straw approaches a narrowed throat or passage-way between the rear end of the table $H^2$ and the cutters, the table or carrier preceding that at $H^2$ extending on lines which tend to approach those of the cutters, while the carrier or table $H^2$ recedes from them. By having the straw advancing parts at H and $H^2$ imperforate as shown the grain which is loosened by the blows of the descending cutter and cutter carrier is prevented from dropping downward and caused to advance to the cylinder.

By having the cutter carrier arranged to not only reciprocate longitudinally but to rise and fall vertically toward and from the tables I avoid the necessity of lifting the bundles over any long distance, while they are on the first table, in order to reach the knives; the machine being superior in this respect to those in which rotary cutters on a stationary shaft were used together with devices for lifting the bundles, such devices having been used together with an endless carrier, the lifter passing up through perforations or slots in the table of the endless carrier.

In Fig. 15 I have shown the character of the paths followed by the cutters as a result of the manner in which the cutter carrier is supported, and in which the cutters are disposed thereon, all in accordance with the description above presented.

What I claim is:—

1. The combination with the independently mounted reciprocating tables H, $H^2$, the former situated approximately horizontal, and the latter being inclined therefrom downwardly, and the crank shaft F above the adjacent ends of the said tables, of the bars F' connected to the said crank shaft, the links for supporting the bars, and the cutters below the bars, each bar having a series of cutters situated on a line approximating parallelism with the table H, and a series of cutters on another line approximating parallelism with the table $H^2$, substantially as set forth.

2. In a band cutter and feeder the herein described cutter bars F' having a series of cutters $f$ approximately parallel with the bar, and cutters $f^8$ on a line inclined thereto, and mechanism substantially as set forth for imparting a combined rotary and reciprocating motion to said bars, as described.

3. In a band cutter, the combination with the cutter bars free at their rear ends and the crank shaft connected to said bars intermediately of their ends, of the supplemental cutter-supporting bars extending downward from the bars F', and the links F³ at the front ends of the bars, substantially as set forth.

4. The combination of the main cutter bars F', means for imparting a rotary movement to the rear ends of said bars and a longitudinal reciprocating movement at their front ends, the cutter bars $f^2$ each supported by and below one of the bars F' and means for adjusting vertically the bars $f^2$ at one end, substantially as set forth.

5. The combination with the straw supporting and advancing devices having a rear part approximately horizontal and a front part inclined to the rear part, of the cutter bars F' having cutters $f$ over the rear part of the support, and cutters $f^4$ situated over the front inclined part of the said support and formed each with an inclined edge at the rear and a vertical edge at the front, and means for imparting a continuous or rotational movement to the rear part of the bars F' and a reversing or oscillatory movement to the front part thereof, substantially as set forth.

6. In a band cutter and feeder, the combination with the longitudinally reciprocating bars F', each bar having a series of cutters, of the floor section H provided with a series of forwardly inclined projections or fingers $h$, for engaging with and advancing the straw delivered to such floor section, and at its forward end with a series of curved fingers or projections $h'$ for retarding the forward movement of the lower portions of the straw delivered to said table, and guiding it toward the bars F', substantially as and for the purpose set forth.

7. In a band cutter and feeder, the combination with the cutting and feeding mechanism, of the two longitudinally and oppositely reciprocating floor sections below the cutting mechanism, the section H having a series of projections $h$ on its upper surface, for advancing straw delivered thereto, and having at its forward end a series of prolonged fingers $h'$, the free ends of which extend over the rear end of the section H² and are bent or curved upwardly, to retard the passage of straw from the section H, and the section H² having near its rear end a series of fingers N which lie between the fingers $h'$ and extend substantially parallel to the upwardly curved portions thereof, substantially as set forth.

8. In a band cutting and feeding mechanism, the combination of the reciprocating floor section H having at its inner end the relatively prolonged fingers $h'$ adapted to hold the straw while the bands are being cut, and the inner reciprocating table H² having the prolonged fingers N projecting upwardly and inwardly and arranged to retard the under side of the mass of straw, and the band cutting mechanism arranged above the section H and the fingers or arms $h'$, substantially as set forth.

9. The combination of the reciprocating table H for the bundles, having the feeding fingers $h$, and having means at the front end for retarding the bundles of straw until the bands are cut, the inner reciprocating table H² having the relatively prolonged upwardly projecting fingers N adapted to enter the masses of straw and retard the under side thereof after the bands are cut, the band cutting mechanism above the table H, and the reciprocating fingers or arms over the table H² and above the straw, and adapted to push forward the straw in the upper parts of the masses while that on the lower side is being held back by the fingers N, substantially as set forth.

10. The combination with the cutters having a combined reciprocating and rotary movement, of the two longitudinally and oppositely reciprocating floor sections below the cutters, the section H being provided at its forward end with the horizontally elongated forwardly projecting fingers $h'$ and the forward section H² being provided with the inclined elongated forwardly projecting fingers N arranged below the fingers $h'$, substantially as set forth.

11. In a band cutter and feeder, the combination of the crank shaft F, the links F³ on the cylinder side of said shaft, and extending to points below the crank shaft, the cutter bars F' mounted on the cranks of the shaft F and hinged to said links F³, the cutters on the under side of the said bars F', the vertically and longitudinally reciprocating table H relatively near a horizontal plane, the table H² in a plane more remote from the horizontal and inclined toward the concave, and means for reciprocating the table H² oppositely to the table H, substantially as set forth.

12. In a band cutter and feeder, the combination with the reciprocating cutting mechanism, of the reciprocating table H arranged below the cutting mechanism and connected with independent rocking devices at its forward and rear ends those at the front end being hangers extending upwardly from the table, the rocking devices at the rear end being relatively shorter than those at the forward end of said table, and means at the forward end of said table for retarding the passage of material therefrom and maintaining the same in the path of the reciprocating cutting mechanism, substantially as set forth.

13. In a band cutting and feeding mechanism, the combination of a series of cutter-carrying bars provided with longitudinally arranged series of cutters, means for feeding the uncut bundles to the cutters, a longitudinally reciprocating straw receiving supporting and propelling table by which the straw is supported while the bands are being cut, and a straw support in advance of the said straw table inclined downward toward the threshing cylinder at an angle different from that of the straw receiving and supporting table, the series of cutters carried by each bar being arranged above the said straw table and inclined straw support and disposed so as to act upon the straw supported by each of the said parts, substantially as set forth.

14. In a band cutter and feeder, the combination of a cutter bar, a series of cutters $f$ connected to the rear portion of said bar, a series of cutters $f^2$ supported by said bar in advance of and on a line inclined downward from the line of the first said cutters, $f$, means for simultaneously reciprocating the cutter bar and rocking it about an axis intermediate of its length and a straw advancing support arranged below the cutters and having a forward part inclined downward and disposed under the cutters $f^2$, and a rear part disposed under the cutters $f$ and having an inclination different from that of the said forward inclined part, substantially as set forth.

15. In a band cutter and feeder, the combination of a crank shaft, the cutter bars directly journaled to the cranks of the said shaft at points intermediate of the ends of the bars, the outer ends of the bars being free, non-rotary guides for the inner ends of the bars, cutters secured to the aforesaid bars, supplemental bars secured to the journaled bars and extending to points below the inner ends thereof and inclined inward and downward therefrom, and cutters carried by the lower inclined bars in front of the crank shaft, substantially as set forth.

16. In a band cutting and feeding mechanism, the combination of a crank shaft, the cutter bars directly journaled to the cranks of said shaft at points intermediate of their ends, the rear ends of the bars being free, non-rotary guides for the front ends of the bars, the reciprocating straw supporting and propelling floor below the cutter bars having a table-like support at the bottom and a series of longitudinally arranged sets of projections extending upward from the table-like bottom part, said projections being arranged substantially as set forth to form a relatively reduced passage-way for the straw below the cutters at a transverse line in front of the crank shaft and below the cutters, and a vertically expanding passage way between said reduced passage-way and the threshing cylinder.

17. In a band cutter and feeder, the combination of a reciprocatory cutter bar, a series of cutters connected to said bar and adapted to act on the forward movement thereof, another set of cutters moving with the bar and adapted to act on the rearward movement thereof, means for adjusting the last said cutters, and means for rocking the cutter bar about an axis near the adjustable cutters as said bar is reciprocated, substantially as set forth.

18. In a band cutter and feeder, the combination of a reciprocating bar, a series of cutters $f$, $f^8$, stationarily secured to said bar, said cutters $f$ extending along a line approximately parallel to the bar and those at $f^8$ extending in a line inclined thereto, and supplemental cutters supported by the bar in advance of those aforesaid and adapted to be adjusted toward and from said bar, substantially as set forth.

19. In a band cutter and feeder, the combination of the support over which the straw moves in passing to the threshing mechanism, the cutter bars above the straw support and driving and guiding means constructed and arranged to give to said bars at one end a continuous or rotational movement in planes substantially normal to the straw support and at their other ends a reversing or oscillatory movement, substantially as set forth.

20. In a band cutter and feeder the combination of the initial carrier, the reciprocating table receiving the straw from the carrier, the second table between the table aforesaid and the cylinder, the crank shaft, the series of sets of longitudinally reciprocating cutters, each cutter set having a bar or carrier directly journaled to a crank on said shaft, a non-rotary support for the inner end of the cutter carrier, some of the cutters on said carrier being between the vertical plane of the crank shaft and the rear end of the cutter carrier, and some between said plane and the front end of the cutter carrier, whereby the cutters of the rear end of the carrier are carried through curvilinear paths with their longer axes approximately vertical above the outer reciprocating table, while the cutters at the other end are carried through curvilinear paths with their longer axes approximately horizontal and over the second table, substantially as set forth.

21. The combination with the threshing cylinder, of means adjacent to the cylinder for feeding the straw directly thereto, comprising means below the straw for engaging and advancing it toward the cylinder, advancing means arranged to act upon the straw from above and adapted to advance the straw more rapidly than the first-mentioned advancing means, and backwardly movable retarding devices arranged below the straw and in proximity to the downwardly acting advancing means and constructed on their backward movement to engage and retard the straw, substantially as set forth.

22. In a band cutting and feeding mechanism, the combination with the cutting mechanism of the supporting and advancing mechanism comprising the reciprocating floor section H having at its inner end forwardly extending projections, the inner downwardly inclined reciprocating table $H^2$ having at its outer end projections extending upwardly in proximity to the first-mentioned projections, and means for reciprocating said tables simultaneously in opposite directions, substantially as set forth.

23. In a band cutting and feeding mechanism, the combination, with the band cutters, of the two longitudinally and oppositely reciprocating tables arranged in the same longitudinal lines, each having a substantially imperforate straw and grain supporting floor, the first table being arranged in approximately horizontal planes and adapted to deliver the straw to the second. and the second arranged on planes inclined downward to the cylinder and adapted to deliver straw thereto, and means for reciprocating each table toward and from the other, substantially as set forth.

24. In a band cutting and feeding mechanism, the combination, with the cutting apparatus, of the two longitudinally reciprocating mutually balancing tables arranged in the same longitudinal lines, each having a floor extending continuously from side to side thereof, the first being arranged to agitate the straw and deliver it to the second, and the second arranged to agitate the straw and deliver it to the cylinder, substantially as set forth.

25. In a band cutting and feeding mechanism, the combination of the two longitudinally reciprocating tables arranged in the same longitudinal lines, the reciprocating cutters, and the cutter carrier moving bodily vertically toward and from the said tables, whereby the vertical elevation of the bundles by the tables relatively to the knives is decreased, substantially as set forth.

26. In a band cutting and feeding mechanism, the combination of the two longitudinally reciprocating tables arranged in the same longitudinal lines, the first table delivering the straw to the second, and the second delivering it to the cylinder, and longitudinally reciprocating band cutters arranged in a series extending longitudinally across the vertical planes of the adjacent ends of the tables, substantially as set forth.

27. In a band cutting and feeding mechanism, the combination of the two longitudinally reciprocating tables arranged in the same longitudinal lines, the first table advancing the straw along approximately horizontal lines, and delivering it to the second, and the second advancing it on inclined lines and delivering it to the cylinder, and the longitudinally arranged reciprocating cutting and feeding apparatus arranged above both the said tables, substantially as set forth.

28. In a band cutting and feeding mechanism, the combination of the two longitudinally reciprocating tables arranged in the same longitudinal lines, the first table advancing the straw approximately horizontally and delivering it to the second, and the second table advancing the straw on inclined lines and delivering it to the cylinder, and longitudinally reciprocating band cutters, arranged in a series which extends longitudinally from points above one of said tables to points above the other, the cutters above the first table rising and falling vertically over distances greater than the vertical movement of the cutters over the second table, substantially as set forth.

29. In a band cutting and feeding mechanism, the combination of two longitudinally reciprocating straw supporting tables below the straw, having their adjacent ends overlapping, a cutter and a cutter carrier arranged to rise from and fall toward the said tables, the said tables being imperforate below the cutter carrier, whereby the grain loosened by the blows of the cutter is carried to the cylinder with the straw, substantially as set forth.

30. In a band cutting and feeding mechanism, the combination of an endless carrier for advancing the bundles, two longitudinally reciprocating tables to which the bundles are delivered, one being arranged in advance of the other and both in the same longitudinal lines, the first table being substantially horizontal and the second table inclined, and the longitudinally reciprocating band cutters arranged across the vertical plane of the adjacent ends of the said tables, substantially as set forth.

31. In a band cutting and threshing mechanism, the combination with the threshing cylinder and the concave, of the crank shaft, the reciprocating cutters carried thereby arranged to act upon the straw from above, a reciprocating platform which supports the bundles of straw while the bands are being severed, a reciprocating table arranged between the said reciprocating platform and the threshing cylinder, and means for simultaneously reciprocating said platform and the table in opposite directions, substantially as set forth.

32. In a band cutting and threshing mechanism, the combination with the threshing cylinder and the concave, of the crank shaft, the reciprocating cutters carried thereby arranged to act upon the straw from above, a reciprocating platform which supports the bundles of straw while the bands are being severed, a reciprocating table arranged between the said reciprocating platform and the threshing cylinder, means for acting upon the straw from above to feed it toward the threshing cylinder while upon the said reciprocating table, and means for continuously and simultaneously reciprocating said platform and table, substantially as set forth.

33. In a band cutting and threshing mechanism, the combination with the threshing cylinder and the concave, of the crank shaft, the reciprocating cutters carried thereby arranged to act upon the straw from above, a reciprocating platform which supports the bundles of straw while the bands are being severed, a reciprocating table arranged between the said reciprocating platform and the threshing cylinder, means for acting upon the straw from above to feed it toward the threshing cylinder while upon the said reciprocating table, means for acting upon the straw from below to retard the lower portions of the straw mass while upon the said reciprocating table, and means for simultaneously reciprocating said platform and table in opposite directions, substantially as set forth.

34. In a band cutting and threshing mechanism, the combination with the threshing cylinder and concave, of the crank shaft, the reciprocating cutters carried thereby arranged to act upon the straw from above, a reciprocating platform which supports the bundles of straw while the bands are being severed, a reciprocating table arranged between the said platform and the threshing cylinder, means for acting upon the straw from above to feed it toward the threshing cylinder while upon the said reciprocating table, means for acting upon the straw from below to retard the lower portions of the straw while upon the said reciprocating table, and means for operating the said supporting platform and reciprocating table, substantially as set forth.

35. In a band cutter and feeder, the combination of the reciprocating platform for supporting and advancing the straw while the bands are being severed, the inclined table between the said platform and the threshing mechanism, the crank shaft, the series of sets of longitudinally reciprocating cutter bars operated by the crank shaft, non-rotary supports for the inner ends of the cutter bars, cutters carried by said bars above and adapted to co-act with the platform, and straw feeders carried by said bars above and adapted to co-act with the inclined table, substantially as set forth.

36. In a band cutter and feeder, the combination of reciprocating bars carrying band-severing knives, an approximately horizontal reciprocating platform under the reciprocating bars to support and advance the straw while the bands are being severed, an inclined table leading from the said reciprocating platform to the threshing cylinder, and means for advancing the straw while on the said inclined table, comprising movable means for engaging the straw from below and relatively faster moving means for engaging the straw from above, substantially as set forth.

37. In a band cutter and feeder, the combination with the initial bundle carrier and the threshing mechanism, of the supports over which the straw moves in passing between the said carrier and threshing mechanism, a cross shaft formed with a plurality of cranks, longitudinally arranged bars journaled to the cranks of the said shaft intermediate their ends, said bars being free at one end, non-rotary supports for the other ends of the bars, and straw cutters and feeders carried by the said bars and arranged longitudinally thereof, substantially as set forth.

38. In a band cutter and feeder, the combination with the threshing cylinder and concave, of the cutter shaft, the cutters operated thereby and arranged to act upon the straw from above, a reciprocating platform which supports the straw while the bands are being severed, a reciprocating table arranged between the said platform and the threshing mechanism, means for simultaneously reciprocating the said platform and table, and means for acting upon the straw from above to feed it toward the threshing mechanism while upon the said table, such means being approximately parallel with the table, substantially as set forth.

39. In a band cutter and feeder, the combination of the reciprocating support over which the straw passes, a series of forwardly inclined fingers carried thereby, a series of retarding fingers arranged adjacent to and in front of the forwardly inclined fingers, and the cutters for severing the bands arranged above the reciprocating support and to the rear of the retarding fingers, substantially as set forth.

40. In a band cutter and feeder, the combination of the reciprocating support over which the straw passes, a series of forwardly inclined fingers carried thereby, a series of retarding fingers arranged adjacent to and in front of the forwardly inclined fingers, means acting upon the straw from above to carry it over the said retarding fingers and toward the threshing mechanism, and cutters for severing the bands arranged above the reciprocating support and to the rear of the retarding fingers, substantially as set forth.

41. In a band cutter and feeder, the combination of the cutters, a support for the straw while the bands are being severed, supports for the straw over which it passes in moving from the cutters to the threshing mechanism, means for lifting the straw from the surface of the last mentioned supports and feeding means for acting upon the straw from above while so lifted, substantially as set forth.

42. In a band cutter and feeder, the combination of a crank shaft, cutter bars directly journaled to the cranks of the said shaft at points intermediate of the ends of the bars, the outer ends of the bars being free, non-rotary guides for the inner ends of the bars, supplemental bars connected to the cutter bars and extending downward and inward therefrom, and feeders for the straw carried by the said supplemental bars in front of the crank shaft, substantially as set forth.

43. In a band cutter and feeder, the combination of a crank shaft, a longitudinally arranged cutter bar journaled to the crank of the shaft, a non-rotary support for the front end of the bar, a series of cutters carried by the rear part of the cutter bar, and a second series of cutters carried by the cutter bar in advance of, and on a line inclined downward from the line of the first series of cutters, substantially as set forth.

44. In a band cutter and feeder, the combination with the threshing mechanism, of the support over which the straw moves in passing to the threshing mechanism, a cross-shaft formed with a plurality of cranks, longitudinally arranged bars pivotally connected intermediate their ends to the cranks of the said shafts, said bars being free at one end, non-rotary supports for the other ends of the bars, and cutters carried by the said bars and arranged longitudinally thereof.

45. In a band cutter and feeder, the combination with the threshing mechanism, of the support over which the straw moves in passing to the threshing mechanism, a cross-shaft formed with a plurality of cranks, bars pivotally connected intermediate their ends to the cranks of the said shafts, said bars being free at one end, non-rotary supports for the other ends of the bars, and cutters carried by the said bars.

46. In a band cutter and feeder, the combination with the threshing mechanism, of the support over which the straw moves in passing to the threshing mechanism, a cross-shaft formed with a plurality of cranks, longitudinally arranged bars pivotally connected intermediate their ends to the cranks of the said shafts, said bars being free at one end, non-rotary supports for the other ends of the bars, and feeders carried by the said bars and arranged longitudinally thereof.

47. In a band cutter and feeder, the combination with the threshing mechanism, of the support over which the straw moves in passing to the threshing mechanism, a cross-shaft formed with a plurality of cranks, bars pivotally connected intermediate their ends to the cranks of the said shaft, said bars being free at one end, non-rotary supports for the other end of the bars, and feeders carried by the said bars.

48. In threshing apparatus, the combination with the threshing cylinder, of the initial carrier for the bundles, the cross-shaft formed with a plurality of cranks intermediate the cylinder and carrier, the bars pivotally connected intermediate their ends to said cranks, said bars being free at one end, non-rotary supports for the other ends of the bars, and straw engaging members carried by the said bars, substantially as set forth.

In testimony whereof I affix my signature, in presence of two witnesses.

JOHN B. BARTHOLOMEW.

Witnesses:
H. N. BLACKMON,
GEORGE F. CARSON.